United States Patent
Patil

(10) Patent No.: US 12,105,491 B2
(45) Date of Patent: Oct. 1, 2024

(54) VAV SELF COMMISSIONING IN A BUILDING AUTOMATION SYSTEM

(71) Applicant: Johnson Controls Tyco IP Holdings LLP, Milwaukee, WI (US)

(72) Inventor: Harshal Patil, Pune (IN)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 239 days.

(21) Appl. No.: 17/554,499

(22) Filed: Dec. 17, 2021

(65) Prior Publication Data
US 2022/0197234 A1 Jun. 23, 2022

(30) Foreign Application Priority Data

Dec. 18, 2020 (IN) .............................. 202021055254

(51) Int. Cl.
*G05B 19/042* (2006.01)
*F24F 11/38* (2018.01)
*F24F 11/49* (2018.01)
*F24F 11/72* (2018.01)

(52) U.S. Cl.
CPC ............ *G05B 19/042* (2013.01); *F24F 11/38* (2018.01); *F24F 11/49* (2018.01); *F24F 11/72* (2018.01); *G05B 2219/25011* (2013.01); *G05B 2219/2614* (2013.01)

(58) Field of Classification Search
CPC .................................................... F24F 11/49
See application file for complete search history.

(56) References Cited

U.S. PATENT DOCUMENTS

| | | | |
|---|---|---|---|
| 7,996,204 B2 | 8/2011 | Hardwick et al. | |
| 9,235,657 B1 | 1/2016 | Wenzel et al. | |
| 10,088,814 B2 | 10/2018 | Wenzel et al. | |
| 10,571,903 B2 * | 2/2020 | Simons | F24F 11/30 |
| 10,684,598 B1 | 6/2020 | Alanqar et al. | |
| 11,441,799 B2 * | 9/2022 | Ribbich | G05D 23/1902 |
| 11,530,835 B2 * | 12/2022 | Hafernik | G06Q 10/20 |

(Continued)

FOREIGN PATENT DOCUMENTS

KR 102081975 B1 * 2/2020

OTHER PUBLICATIONS

Almasi ("Commissioning Tips": https://www.turbomachinerymag.com/view/commissioning-tips; Published Nov. 16, 2016) (Year: 2016).*

(Continued)

*Primary Examiner* — Ryan D Walsh
(74) *Attorney, Agent, or Firm* — Foley & Lardner LLP

(57) ABSTRACT

A method for commissioning a variable air volume (VAV) system is shown. The method includes receiving instructions via an application on a user interface, the instructions provided over a wireless communications network. The method further includes determining that a cold commissioning testing sequence has been completed for the VAV system. The method further includes, in response to determining that the cold commissioning testing sequence has been completed, initiating a hot commissioning testing sequence. The method further includes performing the hot commissioning testing sequence. The method further includes providing a report of the hot commissioning testing sequence to the user interface.

20 Claims, 8 Drawing Sheets

(56) References Cited

U.S. PATENT DOCUMENTS

| | | |
|---|---|---|
| 2006/0275719 A1* | 12/2006 | Hill .................... F23N 5/20 431/24 |
| 2013/0169681 A1 | 7/2013 | Rasane et al. |
| 2017/0242413 A1 | 8/2017 | Piaskowski et al. |
| 2017/0284691 A1 | 10/2017 | Sinha et al. |
| 2017/0308045 A1 | 10/2017 | Dibowski et al. |
| 2017/0315697 A1* | 11/2017 | Jacobson .............. H04L 12/281 |
| 2018/0067635 A1* | 3/2018 | Zummo .............. G06F 3/04847 |
| 2018/0077244 A1 | 3/2018 | Thakkar |
| 2018/0197253 A1 | 7/2018 | Elbsat et al. |
| 2018/0202675 A1 | 7/2018 | Park et al. |
| 2018/0285800 A1 | 10/2018 | Wenzel et al. |
| 2018/0299159 A1 | 10/2018 | Ajax et al. |
| 2019/0025774 A1 | 1/2019 | Wenzel et al. |
| 2019/0128550 A1* | 5/2019 | Campos .................. H04Q 9/00 |
| 2019/0257544 A1 | 8/2019 | Alanqar et al. |
| 2019/0316802 A1 | 10/2019 | Alanqar et al. |
| 2019/0339661 A1 | 11/2019 | Pancholi et al. |
| 2019/0370208 A1 | 12/2019 | Cayemberg et al. |
| 2019/0379555 A1 | 12/2019 | Smith et al. |
| 2020/0026249 A1 | 1/2020 | Przybylski et al. |
| 2020/0028702 A1* | 1/2020 | Sawyer ................ H04L 12/413 |
| 2020/0042918 A1 | 2/2020 | Wenzel et al. |
| 2020/0201275 A1* | 6/2020 | Wiens-Kind ....... G05B 19/0426 |
| 2020/0218991 A1 | 7/2020 | Alanqar et al. |
| 2020/0387041 A1 | 12/2020 | Shrivastava et al. |
| 2021/0018205 A1 | 1/2021 | Ellis et al. |
| 2021/0025608 A1 | 1/2021 | Salsbury et al. |
| 2022/0066434 A1 | 3/2022 | Harvey et al. |

OTHER PUBLICATIONS

Adtance ("Benefits and Metrics of Remote Commissioning"; https://www.adtance.com/en/blog/2020/benefits-and-metrics-of-remote-commissioning; published Oct. 11, 2020) (Year: 2020).*

Andre et al. ("A Functional Test Procedure for the improved commissioning of a VAV system"; https://oaktrust.library.tamu.edu/bitstream/handle/1969.1/5080/ESL-IC-04-10-52.pdf; published Oct. 2004) (Year: 2004).*

Turner ("The Commissioning Process: A Step-by-Step Guide"; https://commissioningandstartup.com/the-commissioning-process-a-step-by-step-guide/; published Jun. 15, 2020) (Year: 2020).*

Thomas ("Commissioning Major Electrical Systems"; https://pdhonline.com/courses/e409/e409content.pdf; Published 2013 (Year: 2013).*

Ma et al., "Model predictive control of building energy systems with balanced model reduction," American Control Conference Fairmont Queen Elizabeth, Montreal, Canada Jun. 27-Jun. 29, 2012 (6 pages).

* cited by examiner

VAV SELF COMMISSIONING IN A BUILDING AUTOMATION SYSTEM

CROSS-REFERENCE TO RELATED APPLICATION

This application claims the benefit of and priority to Indian Provisional Application No. 202021055254, filed Dec. 18, 2020, the entire disclosure of which is incorporated by reference herein in its entirety.

BACKGROUND

The present disclosure relates generally to heating, ventilation, or air conditioning (HVAC) systems. More specifically, the present disclosure relates to commissioning variable air volume (VAV) systems.

Certain building automation systems (BMSs) require heating, ventilation, or air conditioning (HVAC) technicians to commission newly-installed HVAC systems at the location of the system. For example, once a new VAV system has been installed, an HVAC technician needs to travel to the location of the system and perform a commissioning test on the VAV system to verify correct operation. This can be time consuming and efficient. Furthermore, on-site commissioning of VAV systems can increase the risk of exposure of contagious diseases (e.g., COVID-19) between on-site workers. There exists a need to perform off-site self-commissioning of VAV systems over a wireless network.

SUMMARY

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

One implementation of the present disclosure is a method for commissioning a variable air volume (VAV) system. The method includes receiving instructions via an application on a user interface, the instructions provided over a wireless communications network. The method further includes determining that a cold commissioning testing sequence has been completed for the VAV system. The method further includes, in response to determining that the cold commissioning testing sequence has been completed, initiating a hot commissioning testing sequence. The method further includes performing the hot commissioning testing sequence. The method further includes providing a report of the hot commissioning testing sequence to the user interface.

In some embodiments, the cold commissioning testing sequence is performed to determine that mechanical and electrical installation of the VAV system has been completed in a correct manner. In some embodiments, the hot commissioning testing sequence is performed to determine that control functionality and input/output functionality is operating in a correct manner.

In some embodiments, initiating the hot commissioning testing sequence includes performing a series of steps that determine whether components of the VAV system are operating correctly. In some embodiments, performing the series of steps includes providing control signals from a localized VAV controller to HVAC equipment to initiate the series of steps and receiving sensor data at the localized VAV controller, the sensor data comprising information related to operation of the VAV system.

In some embodiments, providing a report of the host commissioning testing sequence to the user interface includes providing operational data measured from VAV sensors during the hot commissioning testing sequence and providing an indication of operability based on the operational data, the indication of operability indicating whether the VAV system is operating within an acceptable threshold.

In some embodiments, the method further includes in response to the indication of operability indicating the VAV system is operating outside of the acceptable threshold, automatically adjusting a control schema of the VAV system. In some embodiments, the method further includes in response to the indication of operability indicating the VAV system is operating outside of the acceptable threshold, providing a notification to the user interface indicating that a user is required to travel to the physical location of the VAV system to correct the VAV system.

In some embodiments, receiving instructions via the application on the user interface includes receiving instructions to perform the hot commissioning testing sequence via system configuration application on the user interface, the user interface hosted on a device located at a different building than the VAV system.

In some embodiments, determining that the cold commissioning testing sequence has been completed includes performing a pre-test prior to the hot commissioning testing sequence, the pre-test configured to provide test signals to equipment within the VAV system to determine that the VAV system has been installed correctly.

In some embodiments, the method further includes receiving instructions to perform a subsequent hot commissioning testing sequence a period of time after the report of the hot commissioning testing sequence was provided to the user interface. The method further includes preforming the subsequent hot commissioning testing sequence. The method further includes determining that the VAV system is operating outside of an acceptable threshold. The method further includes providing a notification to the user interface indicating that a user is required to travel to the physical location of the VAV system to correct the VAV system.

Another implementation of the present disclosure is a variable air volume (VAV) system controller configured to commission a VAV system, the controller including a processing circuit including one or more processors and memory storing instructions that, when executed by the one or more processors, cause the one or more processors to perform operations. The operations include receiving instructions via an application on a user interface, the instructions provided over a wireless communications network. The operations include determining that a cold commissioning testing sequence has been completed for the VAV system. The operations include, in response to determining that the cold commissioning testing sequence has been completed, initiating a hot commissioning testing sequence. The operations include performing the hot commissioning testing sequence. The operations include providing a report of the hot commissioning testing sequence to the user interface.

In some embodiments, the cold commissioning testing sequence is performed to determine that mechanical and electrical installation of the VAV system has been completed in a correct manner. In some embodiments, the hot commissioning testing sequence is performed to determine that control functionality and input/output functionality is operating in a correct manner.

In some embodiments, initiating the hot commissioning testing sequence includes performing a series of steps that determine whether components of the VAV system are operating correctly. In some embodiments, performing the series of steps includes providing control signals from a localized VAV controller to HVAC equipment to initiate the series of steps and receiving sensor data at the localized VAV controller, the sensor data comprising information related to operation of the VAV system.

In some embodiments, providing a report of the host commissioning testing sequence to the user interface includes providing operational data measured from VAV sensors during the hot commissioning testing sequence and providing an indication of operability based on the operational data, the indication of operability indicating whether the VAV system is operating within an acceptable threshold.

In some embodiments, the processing circuit is further configured to, in response to the indication of operability indicating the VAV system is operating outside of the acceptable threshold, automatically adjust a control schema of the VAV system or, in response to the indication of operability indicating the VAV system is operating outside of the acceptable threshold, provide a notification to the user interface indicating that a user is required to travel to the physical location of the VAV system to correct the VAV system.

In some embodiments, receiving instructions via the application on the user interface includes receiving instructions to perform the hot commissioning testing sequence via system configuration application on the user interface, the user interface hosted on a device located at a different building than the VAV system.

In some embodiments, determining that the cold commissioning testing sequence has been completed includes performing a pre-test prior to the hot commissioning testing sequence, the pre-test configured to provide test signals to equipment within the VAV system to determine that the VAV system has been installed correctly.

In some embodiments, the processing circuit is further configured to receive instructions to perform a subsequent hot commissioning testing sequence a period of time after the report of the hot commissioning testing sequence was provided to the user interface. The operations further include performing the subsequent hot commissioning testing sequence, determining that the VAV system is operating outside of an acceptable threshold, and providing a notification to the user interface indicating that a user is required to travel to the physical location of the VAV system to correct the VAV system.

Another implementation of the present disclosure is a non-transitory computer-readable storage media having computer-executable instructions stored thereon that, when executed by one or more processors of a variable air volume (VAV) system, cause the VAV system to perform operations. The operations include receiving instructions via an application on a user interface, the instructions provided over a wireless communications network. The operations further include determining that a cold commissioning testing sequence has been completed for the VAV system. The operations further include, in response to determining that the cold commissioning testing sequence has been completed, initiating a hot commissioning testing sequence. The operations further include performing the hot commissioning testing sequence. The operations further includes providing a report of the hot commissioning testing sequence to the user interface.

In some embodiments, the cold commissioning testing sequence is performed to determine that mechanical and electrical installation of the VAV system has been completed in a correct manner. In some embodiments, the hot commissioning testing sequence is performed to determine that control functionality and input/output functionality is operating in a correct manner.

In some embodiments, initiating the hot commissioning testing sequence includes performing a series of steps that determine whether components of the VAV system are operating correctly. In some embodiments, performing the series of steps includes providing control signals from a localized VAV controller to HVAC equipment to initiate the series of steps. The steps further include receiving sensor data at the localized VAV controller, the sensor data comprising information related to operation of the VAV system.

In some embodiments, providing a report of the host commissioning testing sequence to the user interface includes providing operational data measured from VAV sensors during the hot commissioning testing sequence and providing an indication of operability based on the operational data, the indication of operability indicating whether the VAV system is operating within an acceptable threshold.

DETAILED DESCRIPTION

Overview

Figure 1:
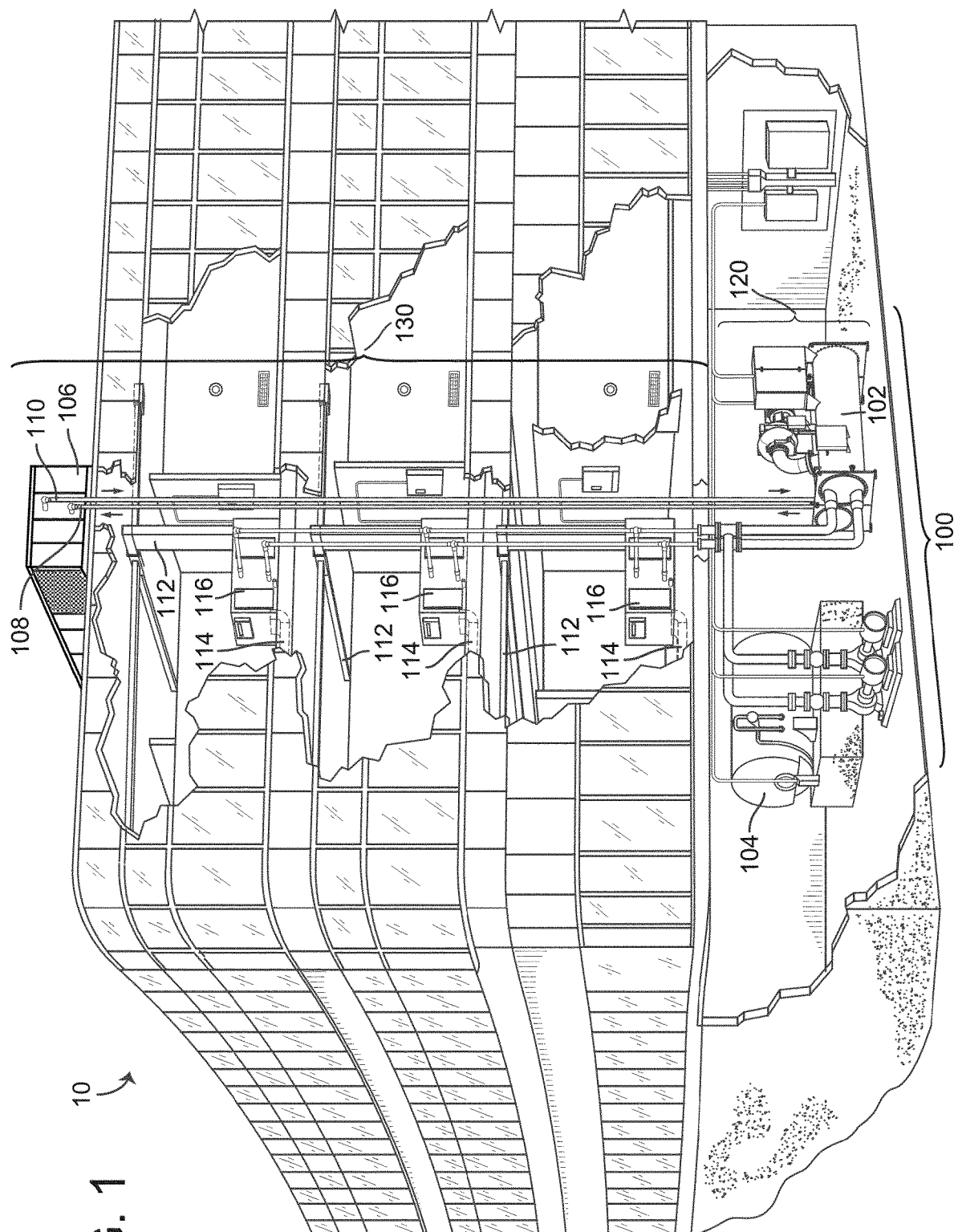
FIG. 1 is a drawing of a building equipped with a HVAC system, according to some embodiments.

Referring generally to the FIGURES, systems and methods for self-commissioning a variable air volume (VAV) system are shown, according to some embodiments. In some embodiments, VAV controllers configured to monitor and control VAV systems/terminals can be commissioned (e.g., tested, etc.) from an off-site location. This can allow HVAC technicians to instruct the VAV controllers to self-commissioning the VAV systems, thus mitigating the need to go on-site for commissioning tests. This can significantly decrease commissioning time, as the technicians do not need to travel to each site to commissioning the VAV systems. Furthermore, these systems and methods can reduce the risk of exposure of contagious diseases (e.g., COVID-19) between on-site workers, as less technicians are required to be on-site in some embodiments. In some embodiments, this self-testing functionality is embedded into existing control application as new control module.

For systems that require the HVAC technician to be present on-site, requires a significant more amount of time, especially if the HVAC technician has to manually generate a report of the VAV system testing. For example, if a technician is going to commission a VAV controller, the technician may need to: manually note supply air temperature and room temperature software, manually command the damper actuator to open/close thru software and record flow to verify damper movement, manually command reheat valve actuator to open/close thru software & record supply air temperature, manually command electric reheat actuator to open/close thru software & record supply air temperature, manually command baseboard reheat actuator to open/close thru software & record room air temperature, manually need to write down the findings from above steps & document on paper/Email to report/record, and manually generate test plans are used to check control loop manually per to make sure VAV is working as per downloaded program file.

While certain systems and methods are directed to a BMS controller and/or a localized VAV controller, any controller described herein can perform the processes and methods for VAV system commissioning. For example, the processes described in FIGS. 6-7 can be performed by BMS controller 366, VAV controller 512, or any combination thereof. Additionally, while VAV systems are generally described herein as implementing the methods and processes described herein, this is merely meant to be exemplary and should not be considered limiting. For example, the self-commissioning processes described in FIGS. 6-7 can be performed on a field controller, zone controller, flow controller, or air handling unit (AHU) controller.

The systems and methods disclosed herein may allow users (e.g., HVAC technicians, etc.) verify operation of all selected VAV controllers from single click/touch on a user device. Once initiated, the system may perform the all above-mentioned commissioning steps thru automatically and may generate the reports automatically (e.g., and detail which VAV's, inputs, and/or outputs have issues that needs to be checked out in person and at on-site VAV locations.

In some embodiments, the systems and methods disclosed herein allow for a controller to automatically command a damper actuator to open/close and record flow rates to verify damper movement. For example, the controller may scan the VAV's on the connecting master-slave token protocol (MS/TP) bus. In some embodiments, the systems and methods disclosed herein allow for a controller to automatically command a reheat valve actuator to open/close and record supply air temperature. This may be performed after anatomically testing the damper actuator as described above. In some embodiments, the systems and methods disclosed herein allow for a controller to automatically command an electric reheat ON/OFF component and record supply air temperature. This may be performed after automatically testing the reheat valve actuator.

In some embodiments, the systems and methods disclosed herein allow for a controller to automatically command a baseboard reheat actuator to open/close and record room air temperature. This step may be performed after automatically testing the electric reheat component. In some embodiments, the systems and methods disclosed herein allow for a controller to automatically a report of some or all the testing process and prepare the report for a user. The report may include data related to stages, input and output values at specific time intervals, and may be recorded in a self-commissioning feature of an application. In some embodiments, the report will be stored automatically on local memory (e.g., within the memory of a controller, etc.) or in a server externally (e.g., in a cloud server, etc.). In some embodiments, the report may be provided in multiple formats, such as excel spreadsheets or pdf documents.

In some embodiments, the automatic process will complete steps sequentially and will perform the commissioning actions intended. At the end of the testing sequence, the report will be generated for the set of VAV's selected wand will outline which VAV issues have occurred (e.g., hardware issues, which technician or sub-contractor electrician has to go on-site to fix, etc.).

In some embodiments, the systems and methods disclosed herein may automatically allow a damper actuator to actuate through multiple positions, record the flow reading (e.g., minimum conditions, in maximum conditions, at gradually increasing damper opening, etc.), then may record the damper position where minimum and maximum flow can be achieved. In some embodiments, the systems and methods disclosed herein may automatically modulate damper position gradually until maximum flow is reached and drive the reheat actuator through multiple gradations of open/close positions, then record the supply air temperature to determine the changes. In some embodiments, the systems and methods disclosed herein may automatically modulate damper position gradually until maximum flow and drive the baseboard actuator thru multiple gradations of open/close positions then record the room temperature at a selected time interval. In some embodiments, the systems and methods disclosed herein may automatically modulate damper position gradually until maximum flow and command electric reheat to turn "on" or "off" and will record the supply air temperature or room temperature keeping electric reheat command "on" or "off" for a selected time interval. In some embodiments, the systems and methods disclosed herein monitor some or all of the situations where the VAV system can fail to function, and design a cause and effect matrix with a rule engine which can include "Fault Detections" for VAV Terminal Units. This may be a pre-loaded set of rules stored in a library in the application, which will provide detailed results of the rules engine. Additionally, this may be stored automatically on local memory (e.g., as in document format, download in excel format, downloaded in pdf format, etc.) or from external memory.

In some embodiments, the systems and methods disclosed herein may be implemented with other building management tools, such as common data model (CDM), digital twinning, virtual systems, object-oriented control schemes, and neural networks.

Building Management System and HVAC System

Referring now to FIG. 1, a perspective view of a building 10 is shown. Building 10 is served by a building management system (BMS). A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. In some embodiments, waterside system 120 is replaced with a central energy plant such as central plant 200, described with reference to FIG. 2.

In some embodiments, building 10 acts as a building or campus (e.g., several buildings) capable of housing some or all components of HVAC system 100. While the systems and methods described herein are primarily focused on operations within a typical building (e.g., building 10), they can easily be applied to various other enclosures or spaces (e.g., cars, airplanes, recreational vehicles, etc.). For example, pollutant management system 502 as described below may be implemented in a recreational vehicle for filtering one or more fluids within the vehicle.

Still referring to FIG. 1, HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that can be operated to control an amount of the supply airflow provided to individual zones of building 10. In other embodiments, airside system 130 delivers the supply airflow into one or more zones of building 10 (e.g., via air supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Figure 2:
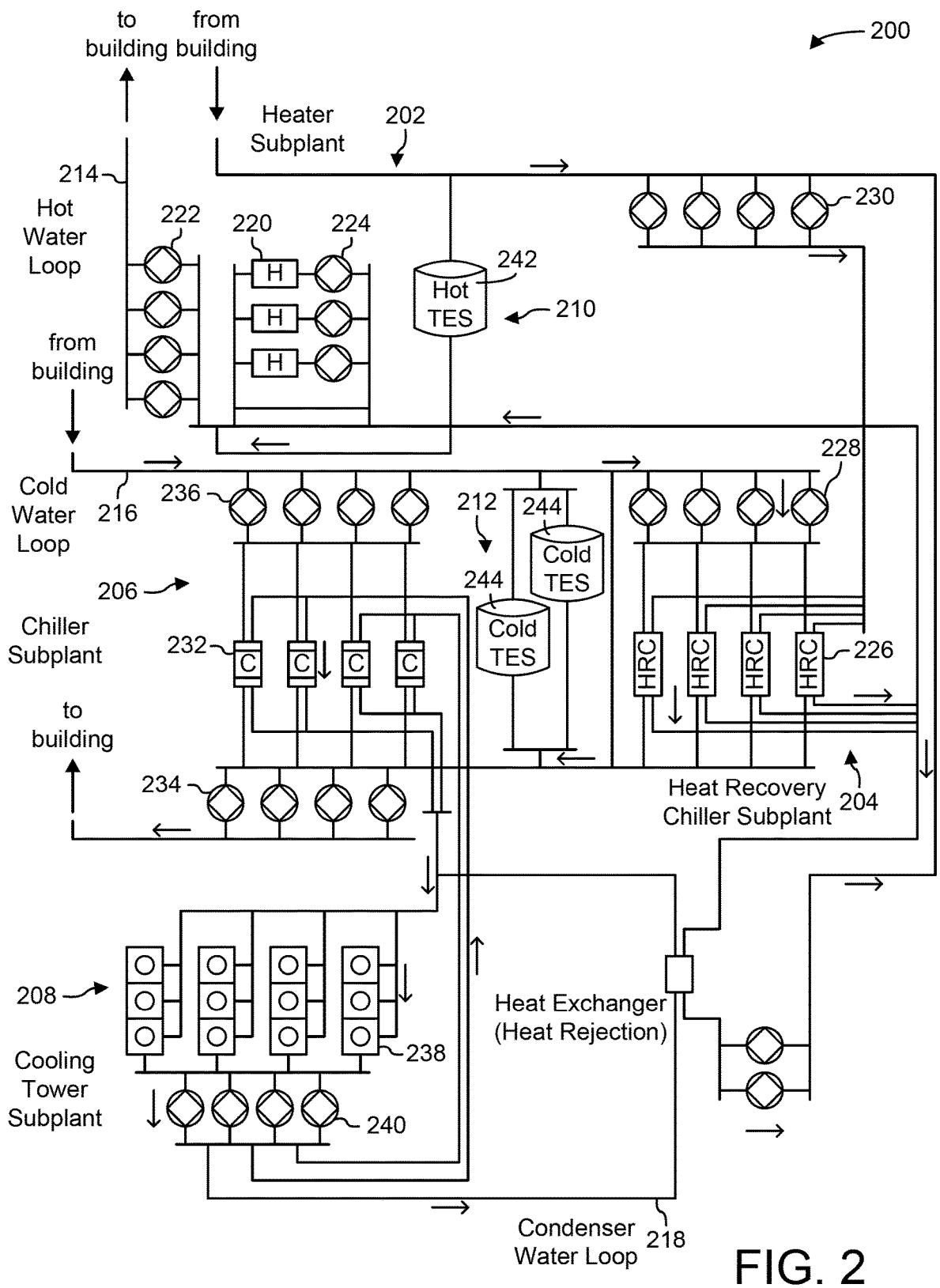
FIG. 2 is a schematic of a waterside system which can be used as part of the HVAC system of FIG. 1, according to some embodiments.

Referring now to FIG. 2, a block diagram of a central plant 200 is shown, according to an exemplary embodiment. In brief overview, central plant 200 may include various types of equipment configured to serve the thermal energy loads of a building or campus (i.e., a system of buildings). For example, central plant 200 may include heaters, chillers, heat recovery chillers, cooling towers, or other types of equipment configured to serve the heating and/or cooling loads of a building or campus. Central plant 200 may consume resources from a utility (e.g., electricity, water, natural gas, etc.) to heat or cool a working fluid that is circulated to one or more buildings or stored for later use (e.g., in thermal energy storage tanks) to provide heating or cooling for the buildings. In various embodiments, central plant 200 may supplement or replace waterside system 120 in building 10 or may be implemented separate from building 10 (e.g., at an offsite location).

Central plant 200 is shown to include a plurality of subplants 202-212 including a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between chiller subplant 206 and building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) may be used in place of or in addition to water to serve the thermal energy loads. In other embodiments, subplants 202-212 may provide heating and/or cooling directly to the building or campus without requiring an intermediate heat transfer fluid. These and other variations to central plant 200 are within the teachings of the present invention.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in central plant 200 (e.g., pumps 222, 224, 228, 230, 234, 236, and/or 240) or pipelines in central plant 200 include an isolation valve associated therewith. Isolation valves may be integrated with the pumps or positioned upstream or downstream of the pumps to control the fluid flows in central plant 200. In various embodiments, central plant 200 may include more, fewer, or different types of devices and/or subplants based on the particular configuration of central plant 200 and the types of loads served by central plant 200.

Figure 3:
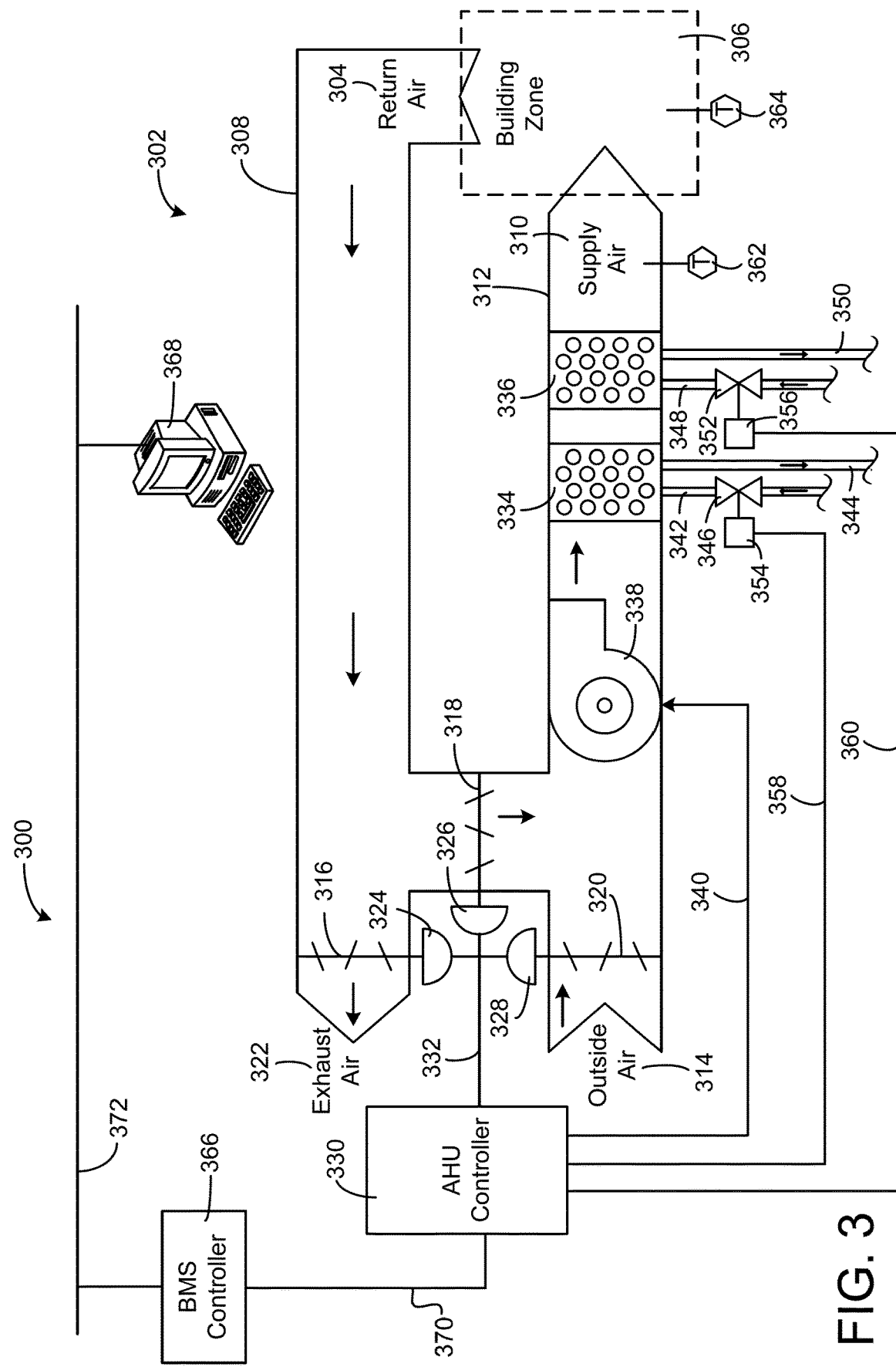
FIG. 3 is a block diagram of an airside system which can be used as part of the HVAC system of FIG. 1, according to some embodiments.

Referring now to FIG. 3, a block diagram of an airside system 300 is shown, according to an example embodiment. In various embodiments, airside system 300 can supplement or replace airside system 130 in HVAC system 100, or can be implemented separate from HVAC system 100. When implemented in HVAC system 100, airside system 300 can include a subset of the HVAC devices in HVAC system 100 (e.g., AHU 106, VAV units 116, duct 112, duct 114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362 and 364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Figure 4:
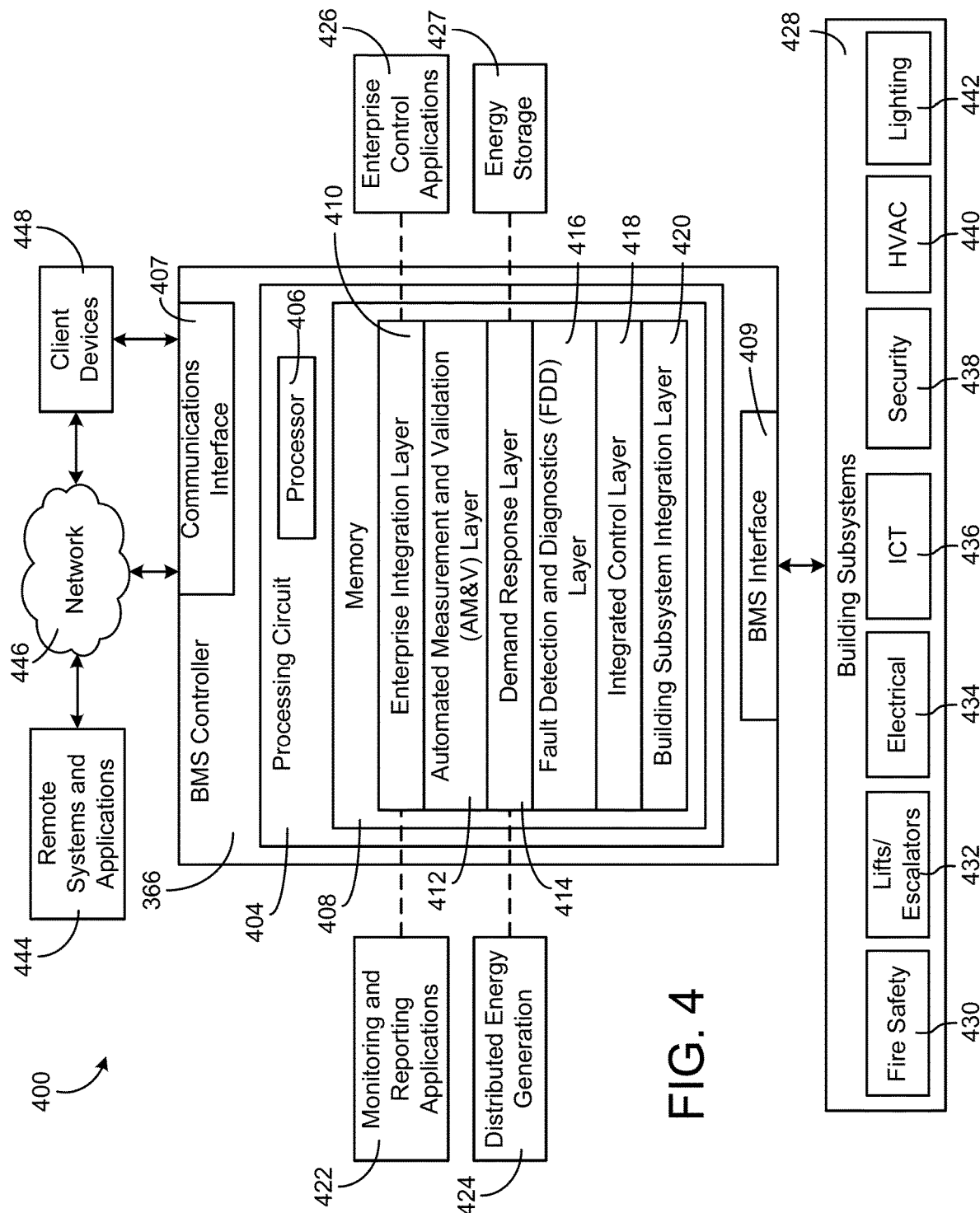
FIG. 4 is a block diagram of a BMS which can be used in the building of FIG. 1, according to some embodiments.

Referring now to FIG. 4, a block diagram of a building management system (BMS) 400 is shown, according to an example embodiment. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2 and 3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices (e.g., card access, etc.) and servers, or other security-related devices.

Still referring to FIG. 4, BMS controller 366 is shown to include a communications interface 407 and a BMS interface 409. Interface 407 can facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 can also facilitate communications between BMS controller 366 and client devices 448. BMS interface 409 can facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to an example embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 can also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 can receive sensor data and input signals from building subsystems 428 and provide output data and control signals to building subsystems 428. Building subsystem integration layer 420 can also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 can receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an example embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 can also include control logic configured to determine when to utilize stored energy. For example, demand response layer 414 can determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 414 can further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an example embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints can also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 can compare a model-predicted output with an actual output from building subsystems 428 to determine an accuracy of the model.

Fault detection and diagnostics (FDD) layer 416 can be configured to provide ongoing fault detection for building subsystems 428, building subsystem devices (i.e., building equipment), and control algorithms used by demand response layer 414 and integrated control layer 418. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alert message to a user, a maintenance scheduling system, or a control algorithm configured to attempt to repair the fault or to work around the fault.

FDD layer 416 can be configured to output a specific identification of the faulty component or cause of the fault (e.g., loose damper linkage) using detailed subsystem inputs available at building subsystem integration layer 420. In other example embodiments, FDD layer 416 is configured to provide "fault" events to integrated control layer 418 which executes control strategies and policies in response to the received fault events. According to an example embodiment, FDD layer 416 (or a policy executed by an integrated control engine or business rules engine) can shut down systems or direct control activities around faulty devices or systems to reduce energy waste, extend equipment life, or assure proper control response.

FDD layer 416 can be configured to store or access a variety of different system data stores (or data points for live data). FDD layer 416 can use some content of the data stores to identify faults at the equipment level (e.g., specific chiller, specific AHU, specific terminal unit, etc.) and other content to identify faults at component or subsystem levels. For example, building subsystems 428 can generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Variable Air Volume (VAV) System

Figure 5A:
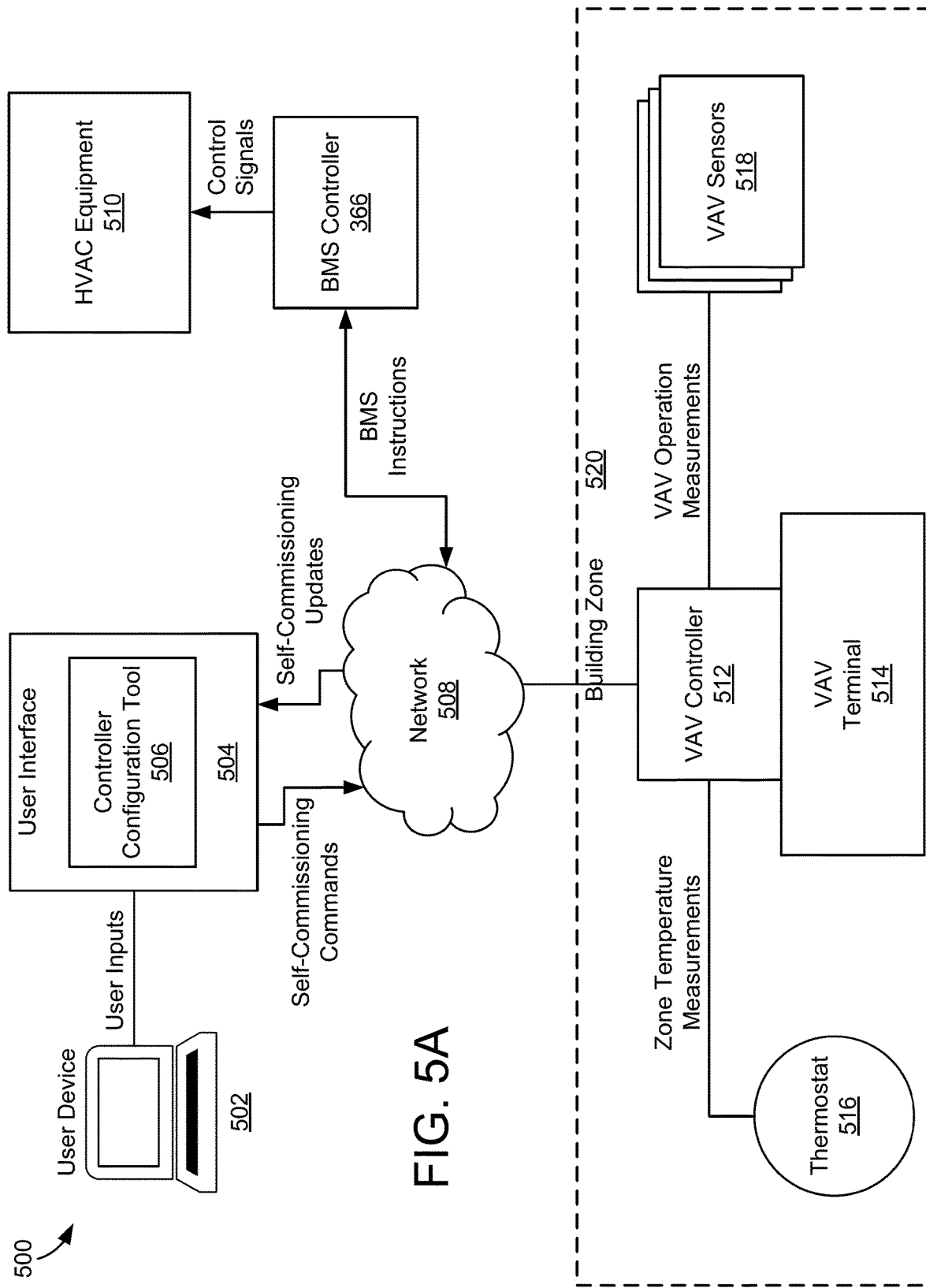
FIG. 5A is a block diagram of a variable air volume (VAV) system which can be implemented in the BMS of FIG. 4, according to some embodiments.

Referring now to FIG. 5A, a block diagram of variable air volume (VAV) system 500 is shown, according to some embodiments. System 500 may be implemented partially or entirely within any of the systems described above, such as waterside system 200, airside system 300, or BMS system 400. For example, system 500 is a subsystem of airside system 300. In some embodiments, system 500 is configured to facilitate commissioning of VAV controller 512 via user instructions provided over network 508. System 500 is shown to include user device 502, user interface 504 including controller configuration tool (CCT) 506, network 508, BMS controller 366, HVAC equipment 510, VAV controller 512, VAV terminal 514, thermostat 516, VAV sensors 518, and building zone 520.

User device 502 may be or include any device capable of communicating with network 508, such as a smartphone, tablet, laptop, or workstation. In some embodiments user device 502 is at a different location than building zone 520. For example, user device 502 is located at home, while building zone 520 is located at the work site where a contracting company is installing and testing VAV controllers. User device 502 may be located close to building zone 520 (e.g., within the neighborhood, at the same building, etc.), or significantly farther away from building zone 520 (e.g., in another state, etc.). User device 594 may be configured to display user interface 504. In some embodiments, user interface 504 displays information related to installing and testing the equipment within building zone 520 and/or other equipment within building 10.

For example, user interface 504 may display controller configuration tool (CCT) 506 which acts as an application for monitoring, adapting, or adjusting the operation of systems within building 10. CCT 502 may be used to configure, simulate, commission, and/or transfer application files to various controllers within BMS system 400. These controllers may include but are not limited to advanced application field equipment controllers (FACs), advanced application programmable controllers (PCAs), expansion input/output modules (PCXs), field equipment controllers (FECs), general purpose application controllers (CGMs), general purpose programmable controllers (PCGs), input/output Modules (IOMs), programmable variable air volume box controllers (PCVs), SNC Series Controllers, variable air volume controllers (VAVs), variable air volume modular assembly controllers (VMAs), variable air volume terminal equipment controllers (CVMs), expansion modules (XPMs).

In some embodiments, CCT 506 includes a configuration mode, a simulation mode, and a commissioning mode. The configuration mode may be used to select mechanical and control logic options for typical air handling, terminal unit, central plant, and/or VAV box mechanical systems (e.g., system 500, etc.). The simulation mode may be used to review application logic as if the system was being commissioned (e.g., during a simulation). In some embodiments, adjustments to setpoints, inputs, or sensors are adjusted during a simulation session to validate the logic before assigning the configuration to a specific controller. The simulation may also include a simulation debugging console configured to setup break points that pause the simulation session based on criteria have been established. In some embodiments, while viewing a simulation session, transitions taking place in the logic are highlighted to help quickly identify where changes occur. The commissioning mode may be used to connect to a device and view actual data from that device (e.g., connect to VAV controller 512 and view/monitor data relating to VAV controller 512, etc.). The commissioning mode may be used to monitor device and set offsets and/or polarity in addition to other parameter and detail changes. For VAV applications, CCT may include an optional box flow test to automatically exercise some or all the VAV boxes within BMS system 400 to ensure correct mechanical installation and/or correct configuration of the VAV boxes. This is described in greater detail below with reference to FIG. 6. A user may provide commands via network 508 for self-commissioning VAV controller 512.

Network 508 may be configured to facilitate communication between user device 502 and components within system 500, such as VAV controller 512. Network 508 may be substantially similar or identical to network 446. In some embodiments, network 508 facilitates communication via a collection of routers (e.g., via the Internet, etc.) and may include cloud-based networking. Network 508 may include wired or wireless communications. For example, user device 502 provides instructions via the internet through network 508 to VAV controller 512. In some embodiments, this is performed via CCT 506.

Building zone 520 may be or include a building space that is served by a VAV terminal. In some embodiments, different building spaces within building 10 require different HVAC supplies. For example, building zone 520 may require heated air to reach a desired setpoint, while an adjacent building zone may require cooled air to reach a desired setpoint. Building zone 520 may be served by VAV terminal 514, which is controlled at least in part by VAV controller 512. Building zone 520 is shown to include VAV controller 512, VAV terminal 514, thermostat 516, and VAV sensors 518.

VAV controller 512 may be configured to control operation of VAV terminal 514. For example, VAV controller 512 may receive sensor data 518 and zone temperature data from thermostat 516 and adjust a damper within VAV terminal 514 to reach the setpoint of thermostat 516. Thermostat 516 may be configured to monitor the temperature of building zone 520 and provide temperature data and other zone data to VAV controller 512 for processing. Additionally, VAV sensors 518 may be configured to monitor VAV parameters of VAV terminal 514, such as inlet air pressure entering VAV terminal 514, position of the damper, speed of the motor driving the damper, air velocity through the damper, air flow through damper, temperature of the air through the damper, temperature of the air leaving the damper, and other parameters.

Figure 5B:
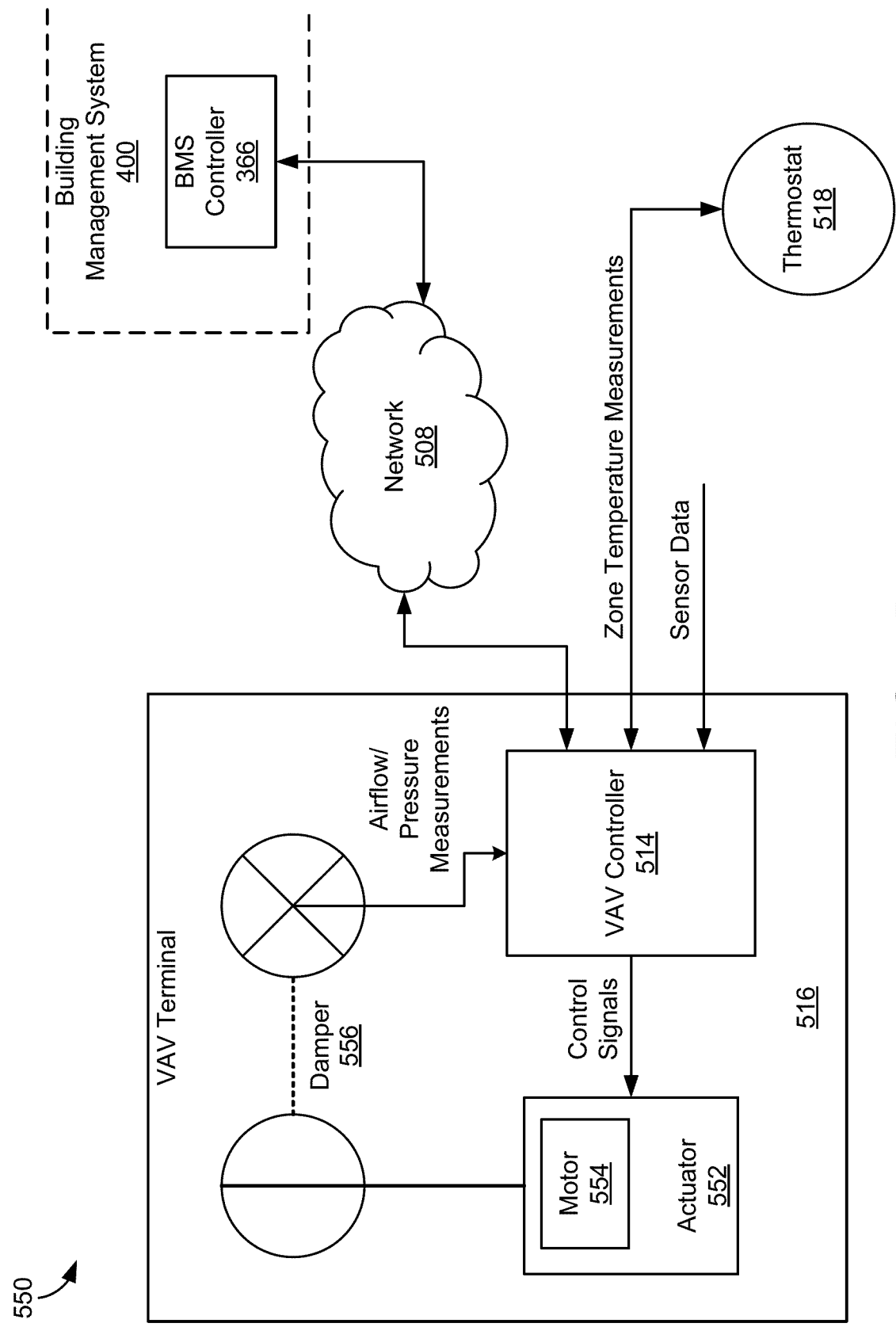
FIG. 5B is a block diagram of a VAV terminal which can be implemented in the system of FIG. 5A, according to some embodiments.

Referring now to FIG. 5B, another block diagram of a variable air volume (VAV) system 550 is shown, according to some embodiments. VAV system 550 may be implemented partially or entirely within system 500. For example, VAV terminal 516 as shown in FIG. 5B may be incorporated into building zone 520 as shown in FIG. 5A. In some embodiments, system 550 is shown to provide a detailed illustration of VAV terminal 516 and how VAV terminal 516 communicably connects with BMS 400. System 550 is shown to include BMS 400, network 508, VAV terminal 516, and thermostat 518. VAV terminal 516 is shown to further include VAV controller 514, actuator 552 including motor 554, and damper 556. VAV controller 514 may be configured to provide control signals to actuator 552. Actuator 552 may be configured to actuate damper 556 of VAV terminal 516 using motor 554.

Figure 6:
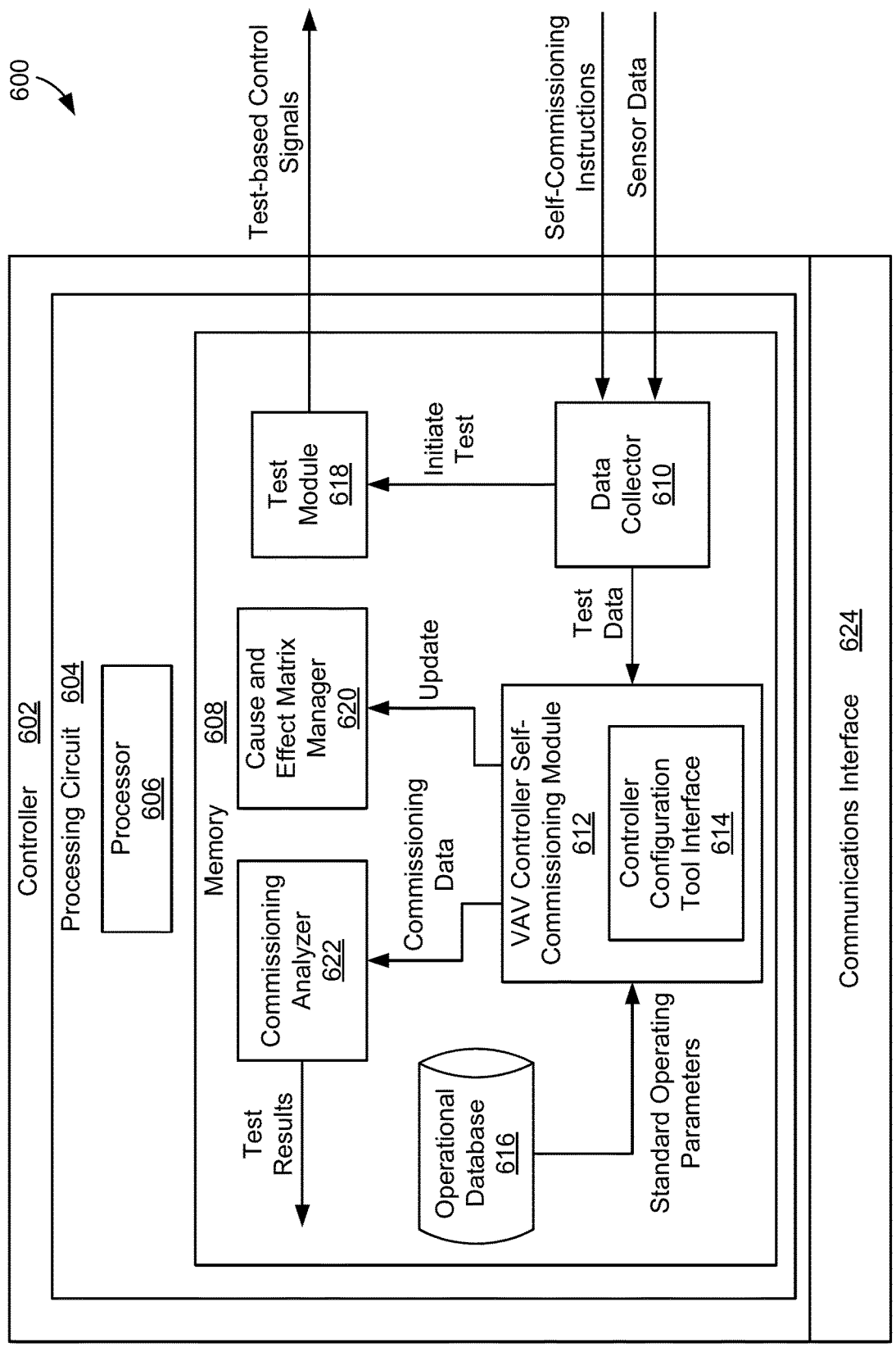
FIG. 6 is a block diagram of a controller for a VAV system which can be implemented in the system of FIG. 5A, according to some embodiments.

Referring now to FIG. 6, a controller 602 for performing self-commissioning of VAV controller 514 is shown, according to some embodiments. Controller 602 may be or include some or all parts of other controllers described herein, such as VAV controller 514, BMS controller 366, or a combination thereof. Controller 602 is shown to include communications interface 624 and processing circuit 604 including processor 606 and memory 608. Processing circuit 604 can be communicably connected to communications interface 624 such that processing circuit 604 and the various components thereof can send and receive data via communications interface 624. Processor 606 can be implemented as a general purpose processor, an application specific integrated circuit (ASIC), one or more field programmable gate arrays (FPGAs), a group of processing components, or other suitable electronic processing components.

Communications interface 624 can be or include wired or wireless communications interfaces (e.g., jacks, antennas, transmitters, receivers, transceivers, wire terminals, etc.) for conducting data communications with building subsystems 428 or other external systems or devices. In various embodiments, communications via communications interface 624 can be direct (e.g., local wired or wireless communications) or via a communications network (e.g., a WAN, the Internet, a cellular network, etc.). For example, communications interface can include an Ethernet card and port for sending and receiving data via an Ethernet-based communications link or network. In another example, communications interface 624 can include a Wi-Fi transceiver for communicating via a wireless communications network. In another example, communications interface 624 can include cellular or mobile phone communications transceivers.

Memory 608 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present disclosure. Memory 608 can be or include volatile memory or non-volatile memory. Memory 208 can include database components, object code components, script components, or any other type of information structure for supporting the various activities and information structures described in the present disclosure. According to an example embodiment, memory 608 is communicably connected to processor 606 via processing circuit 604 and includes computer code for executing (e.g., by processing circuit 604 and/or processor 606) one or more processes described herein.

In some embodiments, controller 602 is implemented within a single computer (e.g., one server, one housing, etc.). In various other embodiments controller 602 can be distributed across multiple servers or computers (e.g., that can exist in distributed locations). Memory 608 is shown to include data collector 610, VAV controller self-commissioning module ("module") 612, controller configuration tool interface 614, operational database 616, test module 618, cause and effect matrix manager 620, and report generator 622.

Data collector 610 may be configured to receive self-commissioning instructions (e.g., via a user device, etc.) and sensor data from VAV sensors 518. In some embodiments, data collector is configured to receive all types of instructions and/or measurements and parse them appropriately. For example, data collector 610 may receive instructions to self-commissioning VAV system 500. Data collector 610 can then provide the test signal indication to test module 618 to begin testing. In some embodiments, this testing is referred to as a hot commissioning testing sequence, which is described in greater detail below with reference to FIG. 8. Data collector 610 is shown to provide test data to module 612.

Module 612 may be configured to analyze the test data and compare the test data to standard operating parameters (e.g., via operational database 616, etc.). This may be done to determine whether the system is operating correctly. For example, test module 618 may—as part of the series of steps for a hot commissioning testing sequence—engage airside system 300 to provide 1 gallon per minute (fpm) of flow to through damper 556 and have airflow sensors (e.g., of VAV sensors 518, etc.) measure the air flow rate. The sensors may measure the air flow rate as 25 gpm. Module 612 may compare the measured data with the expected data to determine that the system is currently operating outside of an acceptable threshold. In the above example, this threshold may be ±20% of the expected flow rate (i.e., 0.75-1.25 gpm). As the measured flow rate was outside of this range, the hot commissioning testing sequence may indicate a failure and notify a user (e.g., HVAC technician, building manager, etc.) that the system is not operating correctly.

In another example, test module 618 instructs controller 602 to satisfy a test setpoint of 73° F. Test module 618 may provide control signals to HVAC system 100 to provide heated or cooled fluid (e.g., air) to damper 556, such that VAV terminal 516 can appropriately heat/cool building zone 520 to reach the intended setpoint. Based on measurements provided by thermostat 518 to data collector 610, module 612 determines that the measured temperature (e.g., 72.8° F.) is substantially close to or within an acceptable range of the intended setpoint. As such, module 612 provides an indication of a successful test to report generator 622 to notify the user via user interface 504.

Operational database 616 may be configured to store standard operating data of system 500 and other system described herein (e.g., HVAC system 100, waterside system 200, airside system 300, BMS system 400, system 550, etc.). The data queried from operational database 616 may be used as comparative data to determine whether test data is indicative of a successful operation or an unsuccessful operation. Operational database 616 may be stored locally within memory 608, externally (e.g., in a cloud server, on a server within building 10, etc.), or a combination thereof.

Cause and effect matrix manager 620 may be configured to receive updates from module 612 based on the testing results. In some embodiments, adjustments to operation of systems 100, 200, 300, 400, 500, and/or 550 may need to be implemented based on hot commissioning testing sequence results. For example, if VAV controller 514 is consistently providing a control signal to damper 556 that is to large (e.g., motor 554 is driving damper 556 open too much—based on position sensor measurements, etc.), manager 620 may be configured to adjust fan 336 blowing air to VAV terminal 514 such that less air is blowing to VAV terminal 514, thus mitigating the effects of the damper position overshoot.

Report generator 622 may be configured to generate a progress report or test results report for a user and provide the report to the user using controller configuration 506. In some embodiments, the report can include all of the test data from several tests, timestamps, graphs, pie charts, and other analytic tools to convey information from the testing. In some embodiments, the report can include suggestion information, such as recommending that an HVAC technician travel to the VAV system 500 on site to perform additional testing. In some embodiments, the report can include notifications and errors indicating issues within system 500 found during the testing.

Figure 7:
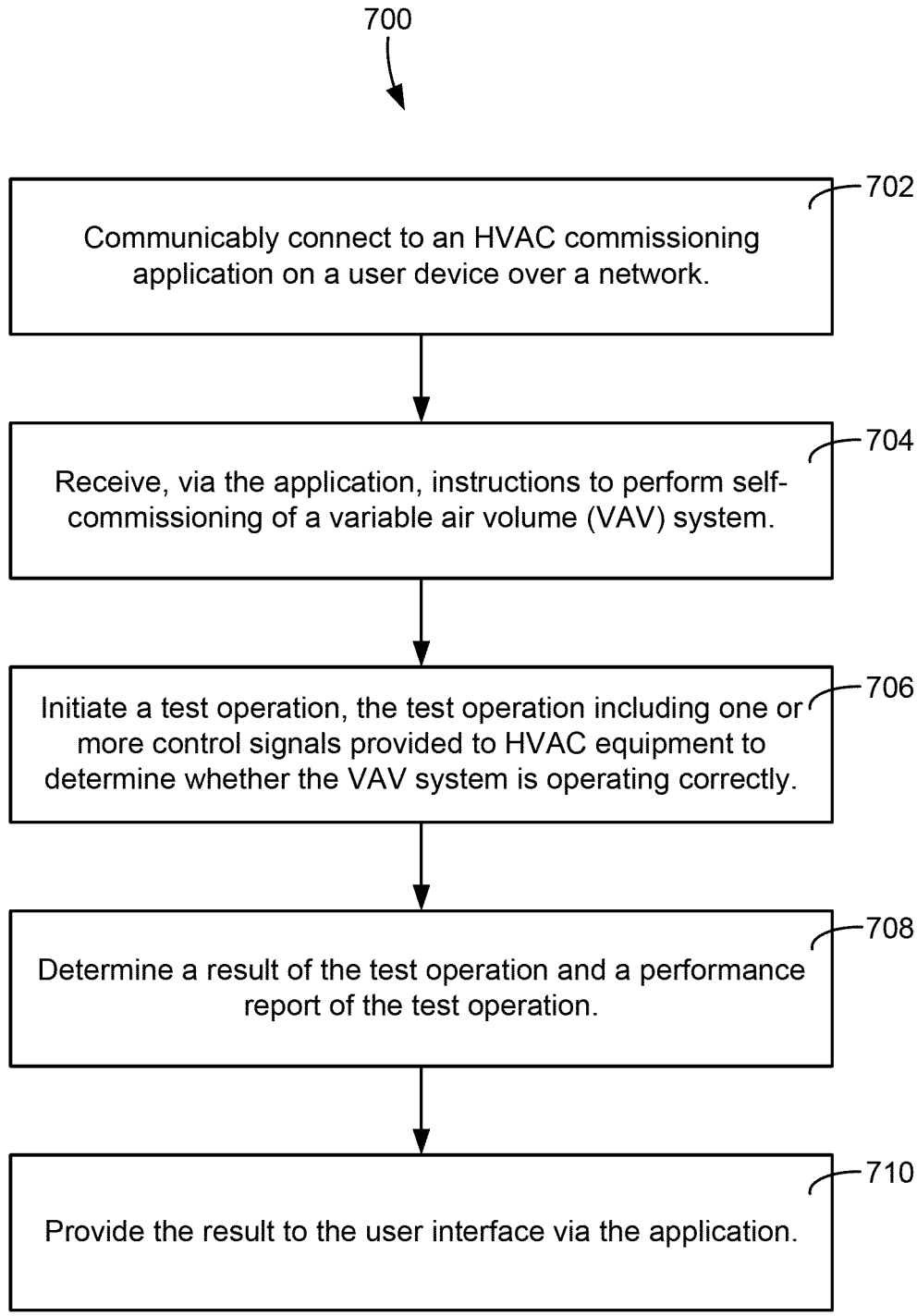
FIG. 7 is a flow diagram of a process for self-commissioning a VAV system, which can be performed by the controller of FIG. 6, according to some embodiments.

Referring now to FIG. 7, a process 700 for self-commissioning a VAV system is shown, according to some embodiments. Process 700 can be performed by any of the processing devices described herein, such as controller 602. Process 700 may be performed by a single processing device or distributed among several device.

Process 700 is shown to include receiving instructions via an application on a user interface, the instructions provided over a wireless communications network (step 702). In some embodiments, a user located at an off-site location (e.g., at a different building, in another city, etc.) logs in to an application (e.g., CCT 506, etc.) and provides instructions of network 508 to conduct a self-commissioning VAV test. Once a VAV terminal has been installed, an HVAC technician may need to commission the VAV terminal to determine if the VAV terminal correctly implemented in a control system correctly. This may be imitated over network 508 instead of the technician initiating the process on-site.

Process 700 is shown to include determining that a cold commissioning testing sequence has been completed for the VAV system (step 704). Prior to initiation a control testing sequence (e.g., hot commissioning testing sequence, etc.), the system needs to know that the VAV terminal and/or system has been installed correctly. For example, that the VAV controller 514 has been mounted within VAV terminal 516, that actuator 552 is coupled to motor 554, and that damper 556 actuates based on motor 554. Mechanical and/or electrical configuration (e.g., installation) may need to be tested prior to control sequencing being tested. This may be implemented using test signals (e.g., a test signal from VAV controller 514 to actuator 552 to actuate damper 556, which can be measured by a position sensor that routes the data back to VAV controller 514, etc.). Once the cold commissioning testing sequence is completed, a notification may be provided to the user via user device 502 to indicate that the initial installation has been completed in a correct fashion (e.g., all of the pre-testing and/or test signals were completed without errors, etc.).

Process 700 is shown to include—in response to determining that the cold commissioning testing sequence has been completed—initiate a hot commissioning testing sequence (step 706). Processor 700 is also shown to include performing the hot commissioning testing sequence (step 708). Initiating the hot commissioning testing sequence may be or include the methods and processes outlined above with respect to FIG. 6. In some embodiments, step 706 includes performing a series of steps that determine whether components of the VAV system are operating correctly. The series of steps may include providing control signals from a localized VAV controller to HVAC equipment to initiate the series of steps and receiving sensor data at the localized VAV controller, the sensor data comprising information related to operation of the VAV system.

Process 700 is shown to include providing a report of the hot commissioning testing sequence to the user interface (step 710). Report generator 622 may be configured to generate the report of the hot commissioning testing sequence based on the test results. The report may indicate the next steps for the user (e.g., HVAC technician, etc.), such as travelling to the VAV system on site, or may indicate any number of errors found during the testing sequence.

Configuration of Exemplary Embodiments

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of various systems (e.g., system 100, system 200, etc.) and methods as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A method for commissioning a variable air volume (VAV) system, the method comprising:
   receive instructions via an application on a user interface, the instructions provided over a wireless communications network;
   determine that a cold commissioning testing sequence has been completed for the VAV system, wherein determining that the cold commissioning testing sequence has been completed comprises performing a pre-test prior to a hot commissioning testing sequence, the pre-test configured to provide test signals to equipment within the VAV system to determine that the VAV system has been installed correctly;
   in response to determining that the cold commissioning testing sequence has been completed, initiate the hot commissioning testing sequence;
   perform the hot commissioning testing sequence; and
   provide a report of the hot commissioning testing sequence to the user interface.

2. The method of claim 1, wherein:
   the cold commissioning testing sequence is performed to determine that mechanical and electrical installation of the VAV system has been completed in a correct manner; and
   the hot commissioning testing sequence is performed to determine that control functionality and input/output functionality is operating in a correct manner.

3. The method of claim 1, wherein initiating the hot commissioning testing sequence comprises performing a series of steps that determine whether components of the VAV system are operating correctly, wherein performing the series of steps comprises:
   providing control signals from a localized VAV controller to HVAC equipment to initiate the series of steps; and
   receiving sensor data at the localized VAV controller, the sensor data comprising information related to operation of the VAV system.

4. The method of claim 1, wherein providing a report of the hot commissioning testing sequence to the user interface comprises:
   providing operational data measured from VAV sensors during the hot commissioning testing sequence;
   providing an indication of operability based on the operational data, the indication of operability indicating whether the VAV system is operating within an acceptable threshold.

5. The method of claim 4, wherein the method further comprises:
   in response to the indication of operability indicating the VAV system is operating outside of the acceptable threshold, automatically adjusting a control schema of the VAV system; or
   in response to the indication of operability indicating the VAV system is operating outside of the acceptable threshold, providing a notification to the user interface indicating that a user is required to travel to the physical location of the VAV system to correct the VAV system.

6. The method of claim 1, wherein receiving instructions via the application on the user interface comprises receiving instructions to perform the hot commissioning testing sequence via system configuration application on the user interface, the user interface hosted on a device located at a different building than the VAV system.

7. The method of claim 1, further comprising:
   in response to the instructions, performing a simulated cold commission testing sequence for the VAV system, wherein the simulated cold commission testing sequence comprises validating an application logic of the VAV system.

8. A method for commissioning a variable air volume (VAV) system, the method comprising:
   receiving instructions via an application on a user interface, the instructions provided over a wireless communications network;
   determining that a cold commissioning testing sequence has been completed for the VAV system;
   in response to determining that the cold commissioning testing sequence has been completed, initiating a hot commissioning testing sequence;
   performing the hot commissioning testing sequence;
   providing a report of the hot commissioning testing sequence to the user interface;

receiving instructions to perform a subsequent hot commissioning testing sequence a period of time after the report of the hot commissioning testing sequence was provided to the user interface;
performing the subsequent hot commissioning testing sequence;
determining that the VAV system is operating outside of an acceptable threshold; and
providing a notification to the user interface indicating that a user is required to travel to the physical location of the VAV system to correct the VAV system.

9. A variable air volume (VAV) system controller configured to commission a VAV system, the controller comprising a processing circuit comprising one or more processors and memory storing instructions that, when executed by the one or more processors, cause the one or more processors to perform operations comprising:
receiving instructions via an application on a user interface, the instructions provided over a wireless communications network;
determining that a cold commissioning testing sequence has been completed for the VAV system, wherein determining that the cold commissioning testing sequence has been completed comprises performing a pre-test prior to a hot commissioning testing sequence, the pre-test configured to provide test signals to equipment within the VAV system to determine that the VAV system has been installed correctly;
in response to determining that the cold commissioning testing sequence has been completed, initiating the hot commissioning testing sequence;
performing the hot commissioning testing sequence; and
providing a report of the hot commissioning testing sequence to the user interface.

10. The controller of claim 9, wherein:
the cold commissioning testing sequence is performed to determine that mechanical and electrical installation of the VAV system has been completed in a correct manner; and
the hot commissioning testing sequence is performed to determine that control functionality and input/output functionality is operating in a correct manner.

11. The controller of claim 9, wherein initiating the hot commissioning testing sequence comprises performing a series of steps that determine whether components of the VAV system are operating correctly, wherein performing the series of steps comprises:
providing control signals from a localized VAV controller to HVAC equipment to initiate the series of steps; and
receiving sensor data at the localized VAV controller, the sensor data comprising information related to operation of the VAV system.

12. The controller of claim 9, wherein providing a report of the hot commissioning testing sequence to the user interface comprises:
providing operational data measured from VAV sensors during the hot commissioning testing sequence;
providing an indication of operability based on the operational data, the indication of operability indicating whether the VAV system is operating within an acceptable threshold.

13. The controller of claim 12, wherein the processing circuit is further configured to:
in response to the indication of operability indicating the VAV system is operating outside of the acceptable threshold, automatically adjust a control schema of the VAV system; or
in response to the indication of operability indicating the VAV system is operating outside of the acceptable threshold, provide a notification to the user interface indicating that a user is required to travel to the physical location of the VAV system to correct the VAV system.

14. The controller of claim 9, wherein receiving instructions via the application on the user interface comprises receiving instructions to perform the hot commissioning testing sequence via system configuration application on the user interface, the user interface hosted on a device located at a different building than the VAV system.

15. The controller of claim 9, wherein the processing circuit is further configured to:
in response to the instructions, perform a simulated cold commission testing sequence for the VAV system, wherein the simulated cold commission testing sequence comprises validating an application logic of the VAV system.

16. A variable air volume (VAV) system controller configured to commission a VAV system, the controller comprising a processing circuit comprising one or more processors and memory storing instructions that, when executed by the one or more processors, cause the one or more processors to perform operations comprising:
receiving instructions via an application on a user interface, the instructions provided over a wireless communications network;
determining that a cold commissioning testing sequence has been completed for the VAV system;
in response to determining that the cold commissioning testing sequence has been completed, initiating a hot commissioning testing sequence;
performing the hot commissioning testing sequence;
providing a report of the hot commissioning testing sequence to the user interface;
receive instructions to perform a subsequent hot commissioning testing sequence a period of time after the report of the hot commissioning testing sequence was provided to the user interface;
preform the subsequent hot commissioning testing sequence;
determine that the VAV system is operating outside of an acceptable threshold; and
provide a notification to the user interface indicating that a user is required to travel to the physical location of the VAV system to correct the VAV system.

17. A non-transitory computer-readable storage media having computer-executable instructions stored thereon that, when executed by one or more processors of a variable air volume (VAV) system, cause the VAV system to perform operations comprising:
receiving instructions via an application on a user interface, the instructions provided over a wireless communications network;
determining that a cold commissioning testing sequence has been completed for the VAV system, wherein determining that the cold commissioning testing sequence has been completed comprises performing a pre-test prior to a hot commissioning testing sequence, the pre-test configured to provide test signals to equipment within the VAV system to determine that the VAV system has been installed correctly;
in response to determining that the cold commissioning testing sequence has been completed, initiating a hot commissioning testing sequence;
performing the hot commissioning testing sequence; and providing a report of the hot commissioning testing sequence to the user interface.

18. The media of claim 17, wherein:
the cold commissioning testing sequence is performed to determine that mechanical and electrical installation of the VAV system has been completed in a correct manner; and
the hot commissioning testing sequence is performed to determine that control functionality and input/output functionality is operating in a correct manner.

19. The media of claim 17, wherein initiating the hot commissioning testing sequence comprises performing a series of steps that determine whether components of the VAV system are operating correctly, wherein performing the series of steps comprises:
providing control signals from a localized VAV controller to HVAC equipment to initiate the series of steps; and
receiving sensor data at the localized VAV controller, the sensor data comprising information related to operation of the VAV system.

20. The media of claim 17, wherein providing a report of the hot commissioning testing sequence to the user interface comprises:
providing operational data measured from VAV sensors during the hot commissioning testing sequence;
providing an indication of operability based on the operational data, the indication of operability indicating whether the VAV system is operating within an acceptable threshold.

\* \* \* \* \*